US012774110B2

(12) United States Patent
Morton et al.

(10) Patent No.: US 12,774,110 B2
(45) Date of Patent: Oct. 27, 2026

(54) AIRCRAFT WITH SYMMETRIC OPEN PROPULSOR ROTATING PATTERNS

(71) Applicant: RTX Corporation, Farmington, CT (US)

(72) Inventors: Jeffrey T. Morton, Manchester, CT (US); Jon E. Sobanski, Glastonbury, CT (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/926,958

(22) Filed: Oct. 25, 2024

(65) Prior Publication Data

US 2026/0116569 A1 Apr. 30, 2026

(51) Int. Cl.
*B64D 35/00* (2006.01)
*F16H 1/28* (2006.01)

(52) U.S. Cl.
CPC ............... *B64D 35/00* (2013.01); *F16H 1/28* (2013.01)

(58) Field of Classification Search
CPC ..... B64D 35/06; B64D 2027/005; F02C 7/36; F16H 1/36; F16H 1/46; F02K 3/072
See application file for complete search history.

(56) References Cited

U.S. PATENT DOCUMENTS 4,728,261 A 3/1988 Wright
4,765,135 A 8/1988 Lardellier
4,936,748 A 6/1990 Adamson
5,090,869 A 2/1992 Wright
8,402,740 B2 3/2013 Guemmer
8,701,381 B2 4/2014 Eames
8,740,565 B2 6/2014 Perkinson
8,814,505 B2 * 8/2014 Bellis ...................... F02C 3/107 415/68
9,869,248 B2 1/2018 Suciu
9,878,798 B2 * 1/2018 Cedoz .................... B64D 35/06
10,202,941 B2 2/2019 Suciu
(Continued)

FOREIGN PATENT DOCUMENTS

DE 102015209148 A1 10/2016
FR 796031 A 3/1936

OTHER PUBLICATIONS

EP Search Report for EP Patent Application No. 25211098.6 dated Jan. 26, 2026.

*Primary Examiner* — Huan Le
(74) *Attorney, Agent, or Firm* — Getz Balich LLC

(57) ABSTRACT

An assembly for an aircraft includes a first propulsion system and a second propulsion system. A first open propulsor rotor is configured to rotate in a first rotational direction about a first axis. A first engine core includes a first rotating structure with a first turbine rotor. A first rotating structure is configured to rotate in the first rotational direction about the first axis and drive rotation of the first open propulsor rotor through a first geartrain. A second open propulsor rotor is configured to rotate in a second rotational direction about a second axis that is opposite the first rotational direction. A second engine core includes a second rotating structure with a second turbine rotor. A second rotating structure is configured to rotate in the first rotational direction about the second axis and drive rotation of the second open propulsor rotor through a second geartrain.

14 Claims, 15 Drawing Sheets

(56) References Cited

U.S. PATENT DOCUMENTS

| | | | | |
|---|---|---|---|---|
| 10,227,928 | B2 * | 3/2019 | Kuhne | F02C 3/107 |
| 10,351,252 | B2 | 7/2019 | Reigner | |
| 11,454,195 | B2 * | 9/2022 | Niergarth | F01D 7/00 |
| 11,834,954 | B2 | 12/2023 | Ostdiek | |
| 11,879,397 | B2 * | 1/2024 | Blake | F02C 7/36 |
| 2016/0185460 | A1 | 6/2016 | Cedoz | |
| 2021/0108597 | A1 | 4/2021 | Marion | |
| 2021/0231058 | A1 | 7/2021 | Plante | |
| 2022/0074349 | A1 | 3/2022 | Valois | |
| 2023/0085244 | A1 | 3/2023 | Miller | |
| 2023/0130860 | A1 | 4/2023 | Piazza | |
| 2024/0017841 | A1 | 1/2024 | Freer | |
| 2024/0017842 | A1 | 1/2024 | Freer | |

* cited by examiner

AIRCRAFT WITH SYMMETRIC OPEN PROPULSOR ROTATING PATTERNS

BACKGROUND OF THE DISCLOSURE

1. Technical Field

This disclosure relates generally to an aircraft and, more particularly, to propulsion system(s) for the aircraft.

2. Background Information

Various types and configurations of aircraft propulsion systems are known in the art including those with one or more open propulsor rotors. While these known aircraft propulsion systems have various benefits, there is still room in the art for improvement.

SUMMARY OF THE DISCLOSURE

According to an aspect of the present disclosure, an assembly is provided for an aircraft. This aircraft assembly includes a first propulsion system and a second propulsion system. The first propulsion system is disposed laterally to a first side of a fuselage of the aircraft. The first propulsion system includes a first open propulsor rotor, a first open guide vane structure, a first engine core and a first geartrain. The first open propulsor rotor is configured to rotate in a first rotational direction about a first axis. The first engine core includes a first rotating structure with a first turbine rotor. The first rotating structure is configured to rotate in the first rotational direction about the first axis and drive rotation of the first open propulsor rotor through the first geartrain. The second propulsion system is disposed laterally to a second side of the fuselage of the aircraft. The second propulsion system includes a second open propulsor rotor, a second open guide vane structure, a second engine core and a second geartrain. The second open propulsor rotor is configured to rotate in a second rotational direction about a second axis that is opposite the first rotational direction. The second engine core includes a second rotating structure with a second turbine rotor. The second rotating structure is configured to rotate in the first rotational direction about the second axis and drive rotation of the second open propulsor rotor through the second geartrain.

According to another aspect of the present disclosure, another assembly is provided for an aircraft. This aircraft assembly includes a first propulsion system and a second propulsion system. The first propulsion system is disposed laterally to a first side of an aircraft fuselage. The first propulsion system includes a first open propulsor rotor, a first engine core and a first geartrain. The first open propulsor rotor is disposed at a forward end of the first propulsion system. The first open propulsor rotor is configured to rotate in a first rotational direction about a first axis. The first engine core includes a first rotating structure with a first turbine rotor. The first rotating structure is configured to rotate in the first rotational direction about the first axis and drive rotation of the first open propulsor rotor through the first geartrain. The second propulsion system is disposed laterally to a second side of the aircraft fuselage. The second propulsion system includes a second open propulsor rotor, a second engine core and a second geartrain. The second open propulsor rotor is disposed at a forward end of the second propulsion system. The second open propulsor rotor is configured to rotate in a second rotational direction about a second axis that is opposite the first rotational direction. The second engine core includes a second rotating structure with a second turbine rotor. The second rotating structure is configured to rotate in the first rotational direction about the second axis and drive rotation of the second open propulsor rotor through the second geartrain.

According to still another aspect of the present disclosure, another assembly is provided for an aircraft. This aircraft assembly includes an open propulsor rotor, an engine core and a geartrain. The open propulsor rotor is configured to rotate about an axis. The engine core includes a flowpath, a compressor section, a combustor section, a turbine section and a rotating structure. The flowpath extends longitudinally through the compressor section, the combustor section and the turbine section from an airflow inlet into the flowpath to a combustion products exhaust from the flowpath. The rotating structure includes a turbine rotor within the turbine section. The rotating structure is configured to rotate about the axis and drive rotation of the open propulsor rotor. The geartrain is disposed axially between and operatively couples the rotating structure and the open propulsor rotor. The geartrain includes a sun gear, a plurality of first intermediate gears, a plurality of second intermediate gears, a ring gear and a carrier. The sun gear is configured to rotate about the axis. The first intermediate gears are arranged circumferentially about the axis and meshed with the sun gear. The second intermediate gears are arranged circumferentially about the axis. Each of the second intermediate gears are rotatably coupled to a respective one of the first intermediate gears. The ring gear circumscribes and is meshed with the second intermediate gears. Each of the first intermediate gears and each of the second intermediate gears are rotatably mounted to the carrier.

The aircraft assembly may also include an open guide vane structure disposed axially next to the open propulsor rotor along the axis.

The open guide vane structure may be configured as a rotationally fixed structure.

The open guide vane structure may be configured as a selectively rotational structure.

The first geartrain may have a first gear system configuration. The second geartrain may have a second gear system configuration that is different than the first gear system configuration.

One of the first geartrain or the second geartrain may be configured as or otherwise include a planetary gear system. The other one of the first geartrain or the second geartrain may be configured as or otherwise include a star gear system.

The first geartrain and the second geartrain may have a common gear ratio.

The first geartrain may include a sun gear, a ring gear, a plurality of intermediate gears and a carrier. The sun gear may be configured to rotate about the first axis. The ring gear may circumscribe the sun gear. The intermediate gears may be meshed with and radially between the sun gear and the ring gear. Each of the intermediate gears may be rotatably mounted to the carrier.

The first rotating structure may be coupled to the first geartrain through the sun gear. The first open propulsor rotor may be coupled to the first geartrain through the carrier.

The ring gear may be stationary.

The second geartrain may include a sun gear, a ring gear, a plurality of intermediate gears and a carrier. The sun gear may be configured to rotate about the second axis. The ring gear may circumscribe the sun gear. The intermediate gears may be meshed with and radially between the sun gear and the ring gear. Each of the intermediate gears may be rotatably mounted to the carrier.

The second rotating structure may be coupled to the second geartrain through the sun gear. The second open propulsor rotor may be coupled to the second geartrain through the ring gear.

The carrier may be stationary.

The first geartrain may include a sun gear, a plurality of first intermediate gears, a plurality of second intermediate gears, a ring gear and a carrier. The sun gear may be configured to rotate about the first axis. The first intermediate gears may be arranged circumferentially about the first axis and meshed with the sun gear. The second intermediate gears may be arranged circumferentially about the first axis. Each of the second intermediate gears may be rotatably coupled to a respective one of the first intermediate gears. The ring gear may circumscribe and may be meshed with the second intermediate gears. Each of the first intermediate gears and each of the second intermediate gears may be rotatably mounted to the carrier.

The first rotating structure may be coupled to the first geartrain through the sun gear. The first open propulsor rotor may be coupled to the first geartrain through the carrier.

The ring gear may be stationary.

The second geartrain may include a sun gear, a plurality of first intermediate gears, a plurality of second intermediate gears, a ring gear and a carrier. The sun gear may be configured to rotate about the second axis. The first intermediate gears may be arranged circumferentially about the second axis and meshed with the sun gear. The second intermediate gears may be arranged circumferentially about the second axis. Each of the second intermediate gears may be rotatably coupled to a respective one of the first intermediate gears. The ring gear may circumscribe and may be meshed with the second intermediate gears. Each of the first intermediate gears and each of the second intermediate gears may be rotatably mounted to the carrier.

The second rotating structure may be coupled to the second geartrain through the sun gear. The second open propulsor rotor may be coupled to the second geartrain through the ring gear.

The carrier may be stationary.

The first open guide vane structure may be axially next to the first open propulsor rotor. The second open guide vane structure may be axially next to the second open propulsor rotor.

The first open guide vane structure may be downstream of the first open propulsor rotor. The second open guide vane structure may be downstream of the second open propulsor rotor.

The first propulsion system may also include a first propulsor module. The first propulsor module may include the first open propulsor rotor and the first geartrain. The first propulsor module may be configured to be installed with or removed from the first engine core as a complete unit. In addition or alternatively, the second propulsion system may also include a second propulsor module. The second propulsor module may include the second open propulsor rotor and the second geartrain. The second propulsor module may be configured to be installed with or removed from the second engine core as a complete unit.

The first propulsor module may also include the first open guide vane structure. In addition or alternatively, the second propulsor module may also include the second open guide vane structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
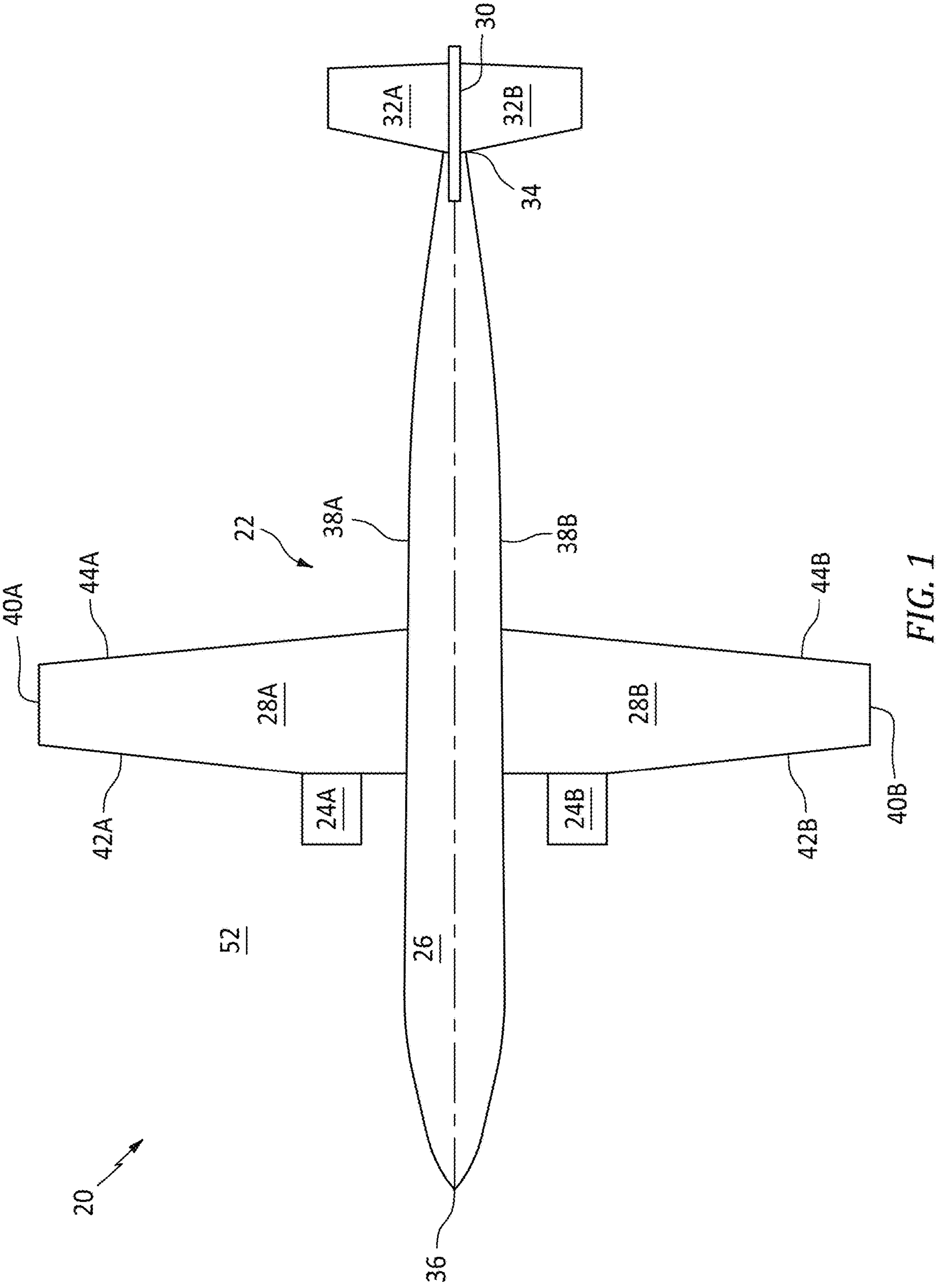
FIG. 1 is a schematic illustration of an aircraft with multiple propulsion systems mounted to wings of the aircraft.

FIG. 1 is a schematic illustration of an aircraft 20. This aircraft 20 may be an airplane, a drone (e.g., an unmanned aerial vehicle (UAV)), or any other manned or unmanned aerial vehicle or system. The aircraft 20 includes an aircraft airframe 22 and one or more aircraft propulsion systems 24A and 24B (generally referred to as "24"); e.g., a pair of companion aircraft propulsion systems.

The aircraft airframe 22 of FIG. 1 includes an aircraft fuselage 26 and one or more aircraft wings 28A and 28B (generally referred to as "28"). This aircraft airframe 22 may also include one or more aircraft stabilizers, such as at least one vertical stabilizer 30 and one or more horizontal stabilizers 32A and 32B arranged at (e.g., on, adjacent or proximate) an aft, downstream tail end 34 of the aircraft fuselage 26. However, in other embodiments, it is contemplated one or more of the aircraft stabilizers 30, 32A and/or 32B may be omitted where, for example, the aircraft 20 is alternatively configured as a blended wing aircraft.

The aircraft fuselage 26 extends longitudinally along a longitudinal centerline of the aircraft airframe 22 and its aircraft fuselage 26 from a forward, upstream nose end 36 of the aircraft airframe 22 and its aircraft fuselage 26 to the fuselage tail end 34. The aircraft fuselage 26 extends laterally between and to opposing lateral sides 38A and 38B (generally referred to as "38") of the aircraft fuselage 26.

The aircraft wings 28A and 28B are arranged to the opposing lateral sides 38A and 38B of the aircraft fuselage 26. The first aircraft wing 28A of FIG. 1, for example, is connected to the aircraft fuselage 26 at the fuselage first side 38A. The second aircraft wing 28B is connected to the aircraft fuselage 26 at the fuselage second side 38B. The aircraft fuselage 26 of FIG. 1 is thereby located laterally between the first aircraft wing 28A and the second aircraft wing 28B. Each of these aircraft wings 28A and 28B projects spanwise out from the aircraft fuselage 26 to a tip 40A, 40B of the respective aircraft wing 28A, 28B. Each of the aircraft wings 28A and 28B extends longitudinally between and to a leading edge 42A, 42B of the respective aircraft wing 28A, 28B and a trailing edge 44A, 44B of the respective aircraft wing 28A, 28B.

Figure 2:
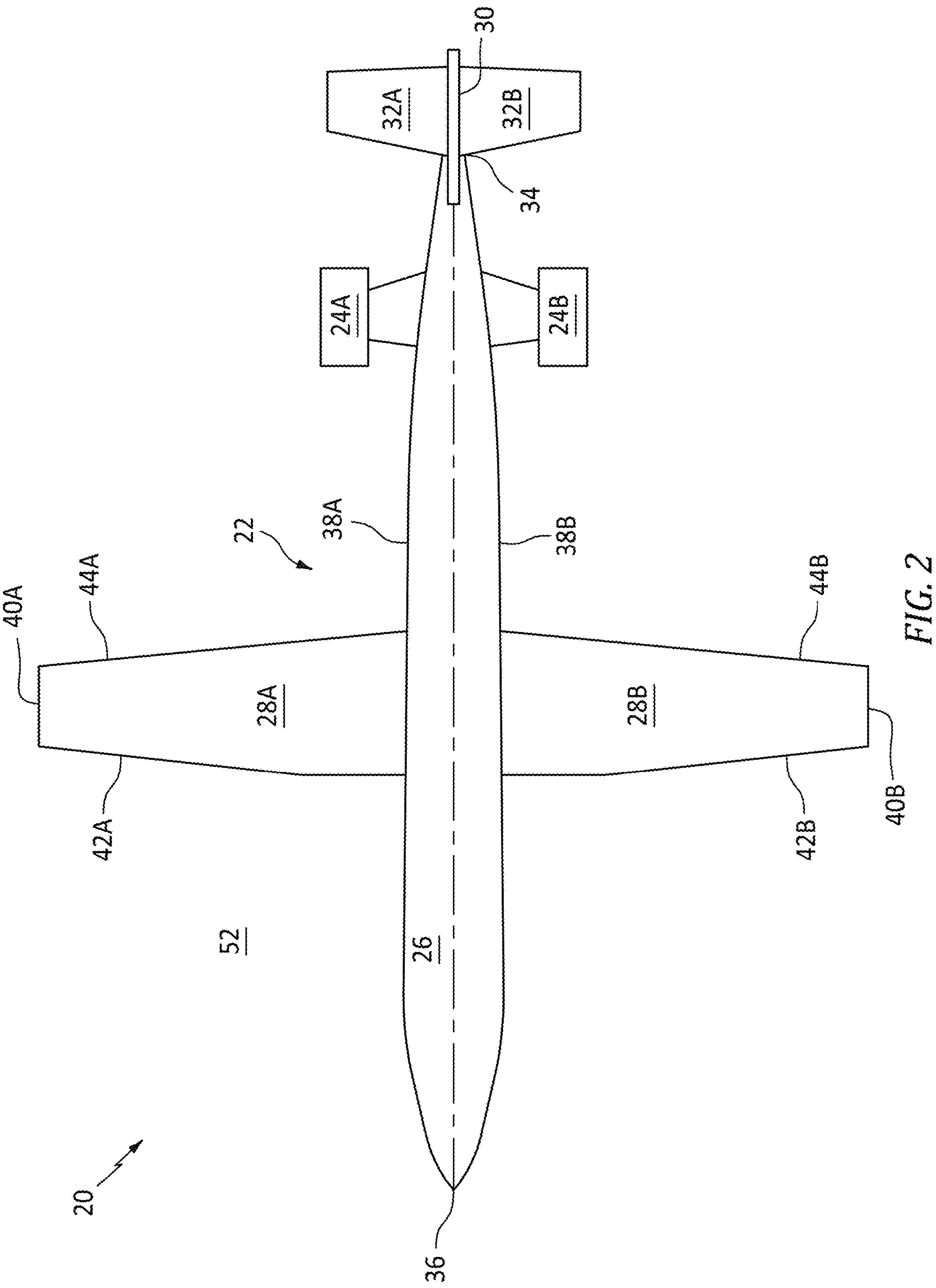
FIG. 2 is a schematic illustration of the aircraft with its propulsion systems mounted to a fuselage of the aircraft.

The aircraft propulsion systems 24A and 24B of FIG. 1 are arranged to the opposing lateral sides 38A and 38B of the aircraft fuselage 26. The first aircraft propulsion system 24A of FIG. 1, for example, is mounted to the first aircraft wing 28A. The second aircraft propulsion system 24B is mounted to the second aircraft wing 28B. The aircraft fuselage 26 of FIG. 1 is thereby located laterally between the first aircraft propulsion system 24A and the second aircraft propulsion system 24B. The present disclosure, however, is not limited to such an exemplary arrangement. For example, referring to FIG. 2, the first aircraft propulsion system 24A may alternatively be mounted to the aircraft fuselage 26 at the fuselage first side 38A. The second aircraft propulsion system 24B may alternatively be mounted to the aircraft fuselage 26 at the fuselage second side 38B.

Figure 3:
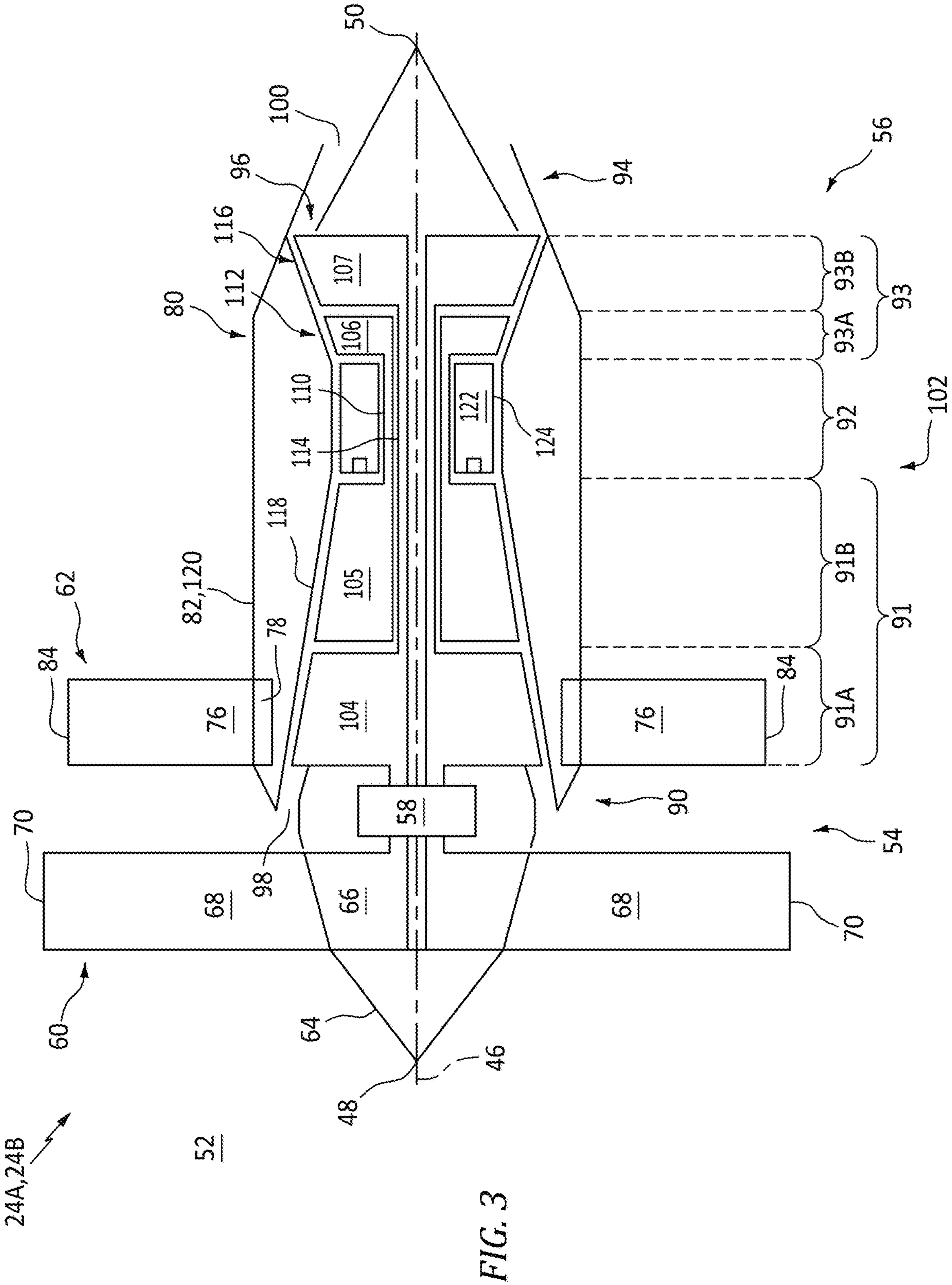
FIG. 3 is a schematic illustration of an exemplary one of the propulsion systems.

Referring to FIG. 3, each aircraft propulsion system 24 extends axially along an axis 46 between an upstream, forward end 48 of the aircraft propulsion system 24 and a downstream, aft end 50 of the aircraft propulsion system 24. The propulsion system axis 46 may be a centerline axis of the respective aircraft propulsion system 24 and/or a centerline axis of one or more members of the respective aircraft propulsion system 24. The propulsion system axis 46 may also or alternatively be a rotational axis of one or more members of the respective aircraft propulsion system 24.

Each aircraft propulsion system 24 may be configured as an open rotor propulsion system with a single open rotor and swirl recovery vane (SRV) architecture. Herein, the term "open" may describe a propulsion system section and/or a propulsion system component which is open to an environment 52 (e.g., an ambient environment) external to the aircraft propulsion system 24 and, more generally, the aircraft 20. The aircraft propulsion system 24 of FIG. 3, for example, includes an open rotor propulsion section 54, a gas turbine engine 56 and a geartrain 58.

The propulsion section 54 of FIG. 3 includes an open propulsor rotor 60 and an open guide vane structure 62. These propulsion section members 60 and 62 are un-ducted and unshrouded components of the aircraft propulsion system 24 and its propulsion section 54. The propulsion section 54 of FIG. 3 also includes a nose cone 64 disposed at (e.g., on, adjacent or proximate) the propulsion system forward end 48. Briefly, this nose cone 64 may be configured as a spinner which is rotatable with the propulsor rotor 60 about the propulsion system axis 46. Alternatively, the nose cone 64 may be configured as a stationary structure of the propulsion section 54.

The propulsor rotor 60 includes a rotor base 66 (e.g., a disk or a hub) and a plurality of open propulsor blades 68 (e.g., airfoils). The propulsor blades 68 are arranged and may be equispaced circumferentially about the rotor base 66 and the propulsion system axis 46 in an array; e.g., a circular array. Each of the propulsor blades 68 is connected to (e.g., formed integral with or otherwise attached to) the rotor base 66. Each of the propulsor blades 68 projects spanwise along a span line of the respective propulsor blade 68 (e.g., radially relative to the propulsion system axis 46) out from an exterior surface of the rotor base 66, into the external environment 52, to an unshrouded distal tip 70 of the respective propulsor blade 68. Each propulsor blade 68 is thereby configured as an un-ducted and unshrouded propulsor blade which is exposed to (e.g., disposed in) the surrounding external environment 52.

Figure 4:
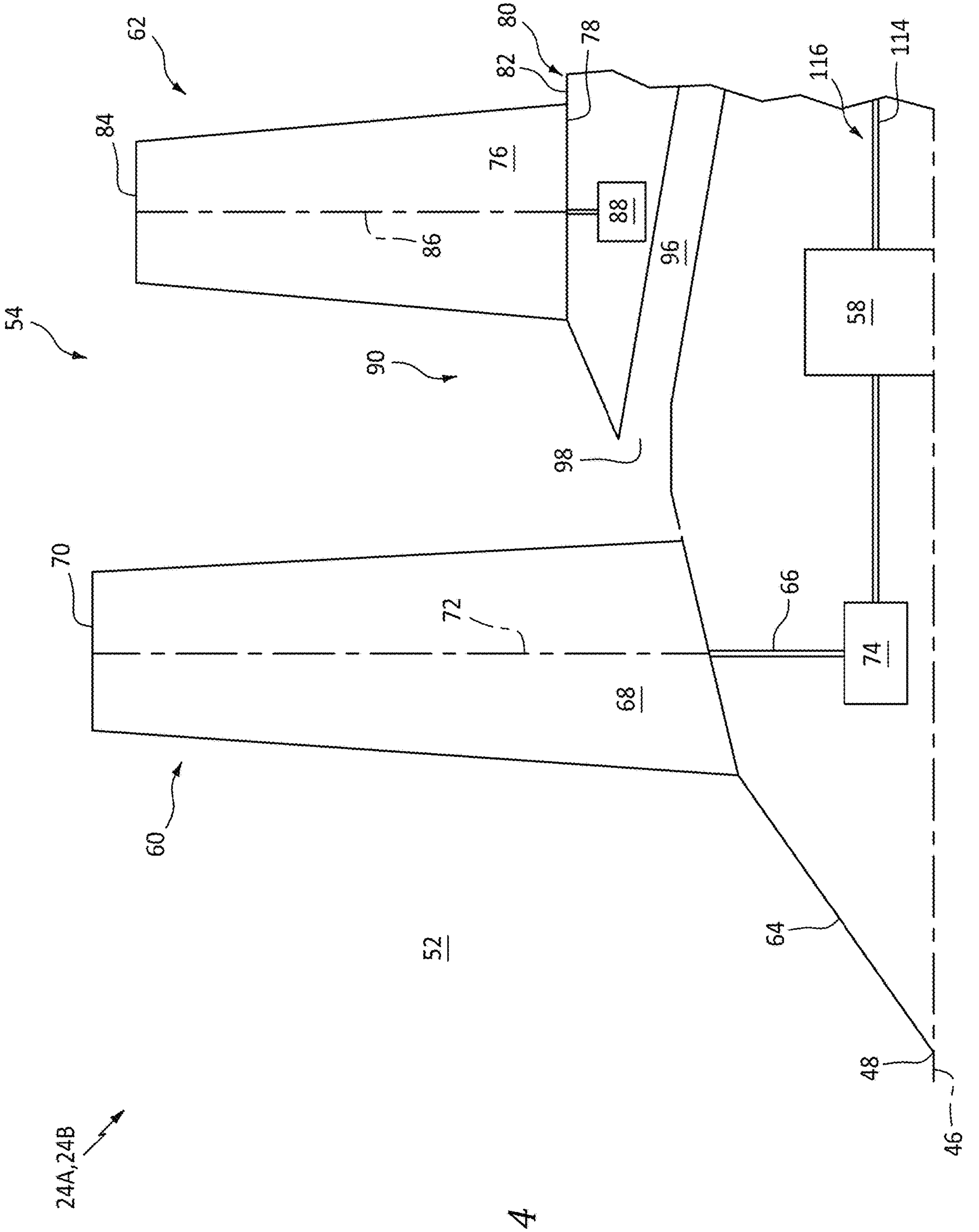
FIG. 4 is a schematic illustration of a forward portion of the propulsion system of FIG. 3.

Referring to FIG. 4, each propulsor blade 68 may be configured to pivot about a respective blade pivot axis 72. This blade pivot axis 72 extends radially relative to the propulsion system axis 46. The blade pivot axis 72 of FIG. 4, for example, is arranged perpendicular to the propulsion system axis 46 when viewed, for example, in a longitudinal reference plane parallel to (e.g., including) the propulsion system axis 46; e.g., the plane of FIG. 4. Each propulsor blade 68 of FIG. 4 is operatively coupled with a blade actuation system 74. This blade actuation system 74 is configured to pivot each propulsor blade 68 about its own respective blade pivot axis 72. By pivoting each propulsor blade 68 about its blade pivot axis 72, a pitch of the respective propulsor blade 68 may be changed. Note, while the blade pivot axis 72 is shown in FIG. 4 as being perpendicular to the propulsion system axis 46, it is contemplated this blade pivot axis 72 may or may not be coincident with the propulsion system axis 46. Moreover, it is contemplated each blade pivot axis 72 may alternatively be angularly offset from the propulsion system axis 46 by an acute angle or an obtuse angle when viewed, for example, in the longitudinal reference plane. Of course, it is contemplated some or all of the propulsor blades 68 may be alternatively moved to change the propulsor blade pitch. Moreover, it is contemplated some or all of the propulsor blades 68 may alternatively be fixed pitch propulsor blades in other embodiments.

The guide vane structure 62 of FIG. 3 includes a plurality of open exit guide vanes 76 (e.g., airfoils) that are arranged and may be equispaced circumferentially about the propulsion system axis 46 in an array; e.g., a circular array. This guide vane structure 62 and its guide vanes 76 are arranged axially next to (e.g., adjacent) the propulsor rotor 60 and its propulsor blades 68. The guide vane structure 62 and its guide vanes 76 of FIG. 3, for example, are arranged downstream of the propulsor rotor 60 and its propulsor blades 68, without (e.g., any) other elements axially therebetween to obstruct, turn and/or otherwise influence the air propelled by the propulsor rotor 60 to the guide vane structure 62 for example. Each of the guide vanes 76 of FIG. 3 is coupled to a support structure 78 of a stationary housing structure 80 for the aircraft propulsion system 24. This support structure 78 may be configured as or otherwise include a support frame, a case and/or another fixed structure of the housing structure 80. Each of the guide vanes 76 projects spanwise along a span line of the respective guide vane 76 (e.g., radially relative to the propulsion system axis 46) out from an exterior surface 82 of the housing structure 80, into the external environment 52, to an unshrouded, distal tip 84 of the respective guide vane 76. Here, the exterior surface 82 radially borders the external environment 52 and forms an exterior aerodynamic flow surface of the aircraft propulsion system 24. Each guide vane 76 is thereby configured as an un-ducted and unshrouded guide vane which is exposed to (e.g., disposed in) the surrounding external environment 52.

Referring to FIG. 4, each guide vane 76 may be configured to pivot about a respective vane pivot axis 86. This vane pivot axis 86 extends radially relative to the propulsion system axis 46. The vane pivot axis 86 of FIG. 4, for example, is arranged perpendicular to the propulsion system axis 46 when viewed, for example, in the longitudinal reference plane. Each guide vane 76 of FIG. 4 is operatively coupled with a vane actuation system 88, which vane actuation system 88 may be discrete from or integrated as part of the blade actuation system 74. The vane actuation system 88 is configured to pivot each guide vane 76 about its own respective vane pivot axis 86. By pivoting each guide vane 76 about its vane pivot axis 86, a pitch of the respective guide vane 76 may be changed. Note, while the vane pivot axis 86 is shown in FIG. 4 as being perpendicular to the propulsion system axis 46, it is contemplated this vane pivot axis 86 may or may not be coincident with the propulsion system axis 46. Moreover, it is contemplated each vane pivot axis 86 may alternatively be angularly offset from the propulsion system axis 46 by an acute angle or an obtuse angle when viewed, for example, in the longitudinal reference plane. Of course, it is contemplated some or all of the guide vanes 76 may be alternatively moved to change the guide vane pitch. Moreover, it is contemplated some or all of the guide vanes 76 may alternatively be fixed pitch guide vanes in other embodiments.

Referring to FIG. 3, the turbine engine 56 includes an inlet section 90, a compressor section 91, a combustor section 92, a turbine section 93 and an exhaust section 94. The compressor section 91 of FIG. 3 includes a low pressure compressor (LPC) section 91A and a high pressure compressor (HPC) section 91B. The turbine section 93 of FIG. 3 includes a high pressure turbine (HPT) section 93A and a low pressure turbine (LPT) section 93B. The turbine engine 56 also includes an (e.g., annular) engine flowpath 96 which extends longitudinally through the aircraft propulsion system 24 of FIG. 1 and its turbine engine 56 from an (e.g., annular) airflow inlet 98 into the engine flowpath 96 to a (e.g., annular) combustion products exhaust 100 from the engine flowpath 96. The flowpath inlet 98 is also an airflow inlet into the aircraft propulsion system 24 of FIG. 1 and its turbine engine 56. The flowpath exhaust 100 is also a combustion products exhaust from the aircraft propulsion system 24 of FIG. 3 and its turbine engine 56. At least (or only) the LPC section 91A, the HPC section 91B, the combustor section 92, the HPT section 93A and the LPT section 93B collectively form a core 102 (e.g., a gas generator) of the turbine engine 56.

Each of the engine sections 91A, 91B, 93A and 93B includes a respective bladed rotor 104-107; e.g., a ducted and/or shrouded engine rotor. Each of these engine rotors 104-107 includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 96. Each of the rotor blades is connected to the respective rotor base. Each of the rotor blades projects radially (e.g., spanwise) out from the respective rotor base into the engine flowpath 96 and to a distal tip of the respective rotor blade.

The HPC rotor 105 is coupled to and rotatable with the HPT rotor 106. The HPC rotor 105 of FIG. 3, for example, is connected to the HPT rotor 106 by a high speed shaft 110. At least (or only) the HPC rotor 105, the HPT rotor 106 and the high speed shaft 110 collectively form a high speed rotating assembly 112; e.g., a high speed spool of the engine core 102. This high speed rotating assembly 112 of FIG. 3 and its members 105, 106 and 110 are rotatable about the propulsion system axis 46. However, in other embodiments, the high speed rotating assembly 112 and its members 105, 106 and 110 may alternatively be rotatable about another rotational axis which is (e.g., laterally and/or angularly) offset from the rotational axis of the propulsor rotor 60.

The LPC rotor 104 is coupled to and rotatable with the LPT rotor 107. The LPC rotor 104 of FIG. 3, for example, is connected to the LPT rotor 107 by a low speed shaft 114. At least (or only) the LPC rotor 104, the LPT rotor 107 and the low speed shaft 114 collectively form a low speed rotating assembly 116; e.g., a low speed spool of the engine core 102. This low speed rotating assembly 116 of FIG. 3 and its members 104, 107 and 114 are rotatable about the propulsion system axis 46. However, in other embodiments, the low speed rotating assembly 116 and its members 104, 107 and 114 may alternatively be rotatable about another rotational axis which is (e.g., laterally and/or angularly) offset from the rotational axis of the propulsor rotor 60.

The low speed rotating assembly 116 is coupled to the propulsor rotor 60 through the geartrain 58. This geartrain 58 is disposed between and operatively couples the propulsor rotor 60 to the low speed rotating assembly 116 and its LPT rotor 107. With this arrangement, the propulsor rotor 60 may rotate at a different (e.g., slower) rotational speed than the low speed rotating assembly 116 and its LPT rotor 107. Depending on the specific configuration of the geartrain 58, the propulsor rotor 60 and the low speed rotating assembly 116 may rotate in a common (the same) direction about the propulsion system axis 46 or in opposite directions about the propulsion system axis 46.

The engine sections 90-94 may be arranged sequentially along the propulsion system axis 46 and are housed within and/or formed by the housing structure 80. This housing structure 80 includes an engine case 118 (e.g., a gas generator case) and a nacelle 120. The engine case 118 houses one or more of the engine sections 91A-93B; e.g., the engine core 102. The engine case 118 of FIG. 3, for example, extends axially along (e.g., axially overlaps) and extends circumferentially about (e.g., circumscribes) the engine sections 91A-93B and their respective bladed rotors 104-107. The engine case 118 may also house the geartrain 58. The nacelle 120 houses and provides an aerodynamic cover over the engine case 118. An exterior wall of the nacelle 120 of FIG. 3, for example, is disposed radially outboard of, extends axially along (e.g., axially overlaps) and extends circumferentially about (e.g., circumscribes) the engine core 102 and its engine case 118. This nacelle wall may at least partially or completely form the exterior surface 82. With the foregoing arrangement, the bladed rotors 104-107 are disposed within the housing structure 80. By contrast, the propulsor rotor 60 and the guide vane structure 62 are disposed at least partially (or completely) outside of the housing structure 80.

During operation of the aircraft propulsion system 24 of FIG. 3, ambient air within the external environment 52 is propelled by the rotating propulsor rotor 60 in the downstream, aft direction towards the propulsion system aft end

50. A major portion (e.g., more than 50%) of this air bypasses the turbine engine 56 to provide forward thrust while a minor portion (e.g., less than 50%) of the air flows into the turbine engine 56. For example, an outer stream of the air propelled by the rotating propulsor rotor 60 flows axially across the guide vane structure 62 and outside of the housing structure 80 and its exterior surface 82; e.g., along an exterior of the nacelle 120. The guide vane structure 62 conditions (e.g., straightens out, de-swirls, etc.) the outer stream of air within the external environment 52 to enhance the forward thrust. By contrast, an inner stream of the air propelled by the rotating propulsor rotor 60 may bypass the guide vane structure 62 and enter the turbine engine 56 and its engine flowpath 96 through the flowpath inlet 98. The air entering the engine flowpath 96 through the flowpath inlet 98 may be referred to as "core air".

The core air is compressed by the LPC rotor 104 and the HPC rotor 105 and directed into a combustion chamber 122 (e.g., an annular combustion chamber) of a combustor 124 (e.g., an annular combustor) in the combustor section 92. Fuel is injected into the combustion chamber 122 by one or more fuel injectors and mixed with the compressed core air to provide a fuel-air mixture. This fuel-air mixture is ignited and combustion products thereof flow through and sequentially drive rotation of the HPT rotor 106 and the LPT rotor 107. The rotation of the HPT rotor 106 and the LPT rotor 107 respectively drive rotation of the HPC rotor 105 and the LPC rotor 104 and, thus, compression of the core air. The rotation of the LPT rotor 107 also drives the rotation of the propulsor rotor 60 through the geartrain 58. The turbine engine 56 and its low speed rotating assembly 116 thereby power operation of (e.g., drive rotation of) the propulsor rotor 60 during aircraft propulsion system operation.

The engine flowpath 96 of FIG. 3 extends longitudinally from the flowpath inlet 98, sequentially through the inlet section 90, the LPC section 91A, the HPC section 91B, the combustor section 92, the HPT section 93A, the LPT section 93B and the exhaust section 94, to the flowpath exhaust 100. The engine flowpath 96 of FIG. 3 is configured such that the core air and the combustion products generally flow in the aft, downstream direction towards the propulsion system aft end 50. The core air and the combustion products thereby flow along with the ambient air propelled by the rotating propulsor rotor 60 in a common axial direction—the downstream, aft direction. The turbine engine 56 of the present disclosure, however, is not limited to such an exemplary common flow engine arrangement. For example, the engine flowpath 96 may alternatively be configured such that the core air and the combustion products generally flow in a forward, upstream direction towards the propulsion system forward end 48. The core air and the combustion products may thereby flow in an opposite direction as the ambient air propelled by the rotating propulsor rotor 60. Here, the turbine engine 56 may have a reverse flow engine arrangement.

Figure 5A:
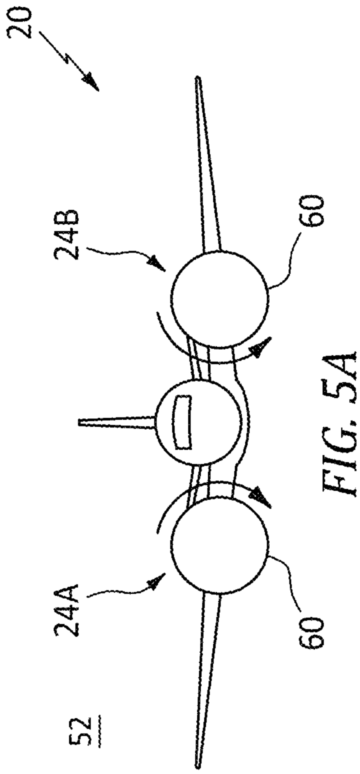
FIGS. 5A and 5B are front view illustrations of the aircraft depicting various symmetric propulsor rotating patterns.
Figure 5B:
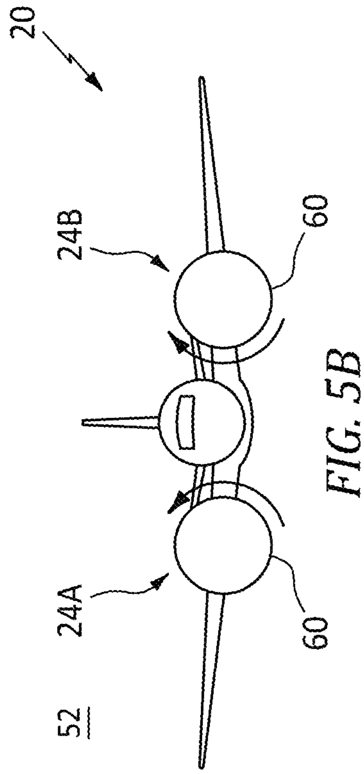
Figure 6:
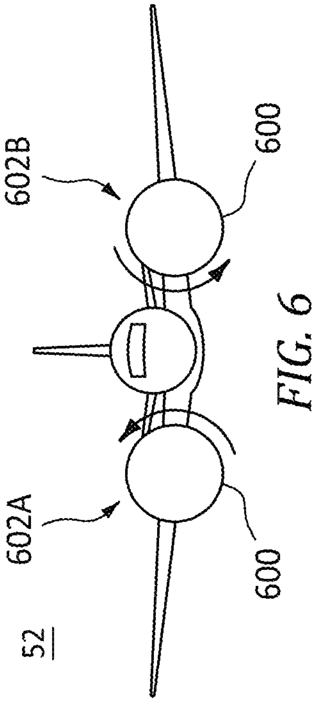
FIG. 6 is a front view illustration of an aircraft depicting an asymmetric propulsor rotating pattern.

The geartrain 58 of the first aircraft propulsion system 24A is configured such that the low speed rotating assembly 116 and the propulsor rotor 60 are counter-rotating bodies. The low speed rotating assembly 116 and its members 104, 107 and 114 of the first aircraft propulsion system 24A, for example, are configured to rotate in a first rotational direction (e.g., clockwise or counterclockwise) about its propulsion system axis 46. The propulsor rotor 60 of the first aircraft propulsion system 24A is configured to rotate in a second rotational direction (e.g., counterclockwise or clockwise) about its propulsion system axis 46, which second rotational direction is rotationally opposite the first rotational direction. By contrast, the geartrain 58 of the second aircraft propulsion system 24B is configured such that the low speed rotating assembly 116 and the propulsor rotor 60 are co-rotating bodies. The low speed rotating assembly 116 and its members 104, 107 and 114 of the second aircraft propulsion system 24B, for example, are configured to rotate in the first rotational direction about its propulsion system axis 46. The propulsor rotor 60 of the second aircraft propulsion system 24B is configured to rotate in the first rotational direction about its propulsion system axis 46. Referring to FIGS. 5A and 5B, the propulsor rotor 60 of the first aircraft propulsion system 24A and the propulsor rotor 60 of the second aircraft propulsion system 24B thereby rotate in different rotational directions during aircraft flight. In FIG. 5A, the propulsor rotors 60 of the aircraft propulsion systems 24A and 24B rotate in an inboard down-down symmetric rotating pattern. In FIG. 5B, the propulsor rotors 60 of the aircraft propulsion systems 24A and 24B rotate in an inboard up-up symmetric rotating pattern. Such symmetric rotating patterns may facilitate a reduction in propulsion system noise, an increase in propulsion system performance, provision of symmetric control surface geometries, etc. By contrast, FIG. 6 illustrates propulsor rotors 600 of right and left side aircraft propulsion systems 602A and 602B rotating in an asymmetric rotating pattern.

Typically, to facilitate a symmetric rotating pattern in companion open rotor and/or inline gearbox engines, prior art companion engines may be configured with different engine cores. For example, a low speed rotating structure in one companion engine may be configured to rotate in the first direction whereas a low speed rotating structure in the other companion engine may be configured to rotate in the second direction. Such an arrangement, however, may lead to duplication of research and development efforts for the two different engine cores. Moreover, to maintain a supply of spare parts, two separate supplies of spare parts may be maintained, one for each engine core configuration. By contrast, the aircraft propulsion systems 24 of the present disclosure may be provided with different geartrain configurations to facilitate the symmetric rotating patterns described above. For example, referring to FIG. 3, the geartrain 58 of the first aircraft propulsion system 24A may be configured as or otherwise include a counter-rotating geartrain 126A; e.g., see FIGS. 7 and 8 and FIGS. 11 and 12. By contrast, the geartrain 58 of the second aircraft propulsion system 24B may be configured as or otherwise include a co-rotating geartrain 126B; e.g., see FIGS. 9 and 10 and FIGS. 13 and 14. Of course, it is contemplated the rotating patterns of the first aircraft propulsion system 24A and the second aircraft propulsion system 24B may be reversed in other embodiments.

Figure 7:
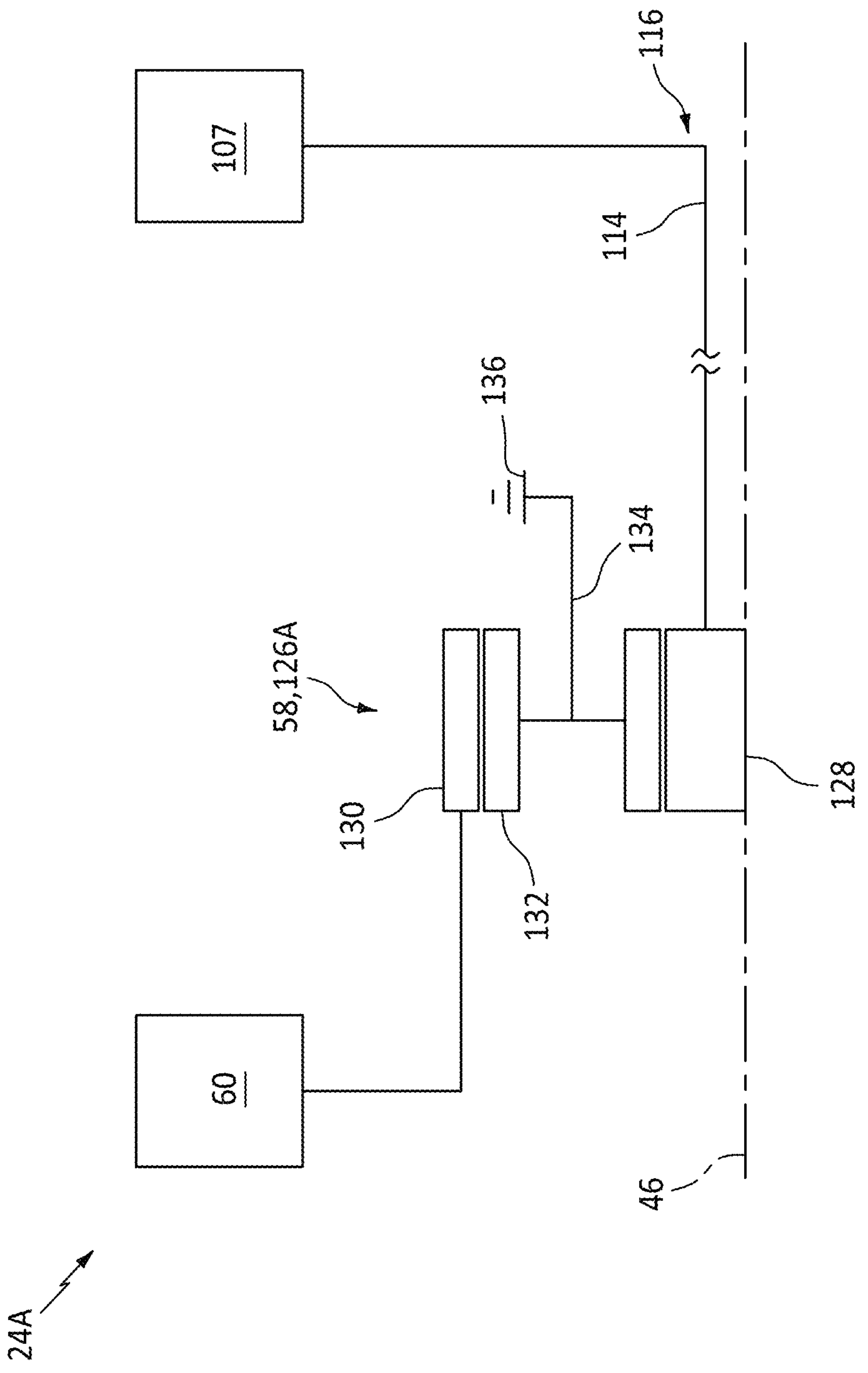
FIG. 7 is a partial schematic illustration of an aircraft propulsion system at a star gear system.
Figure 8:
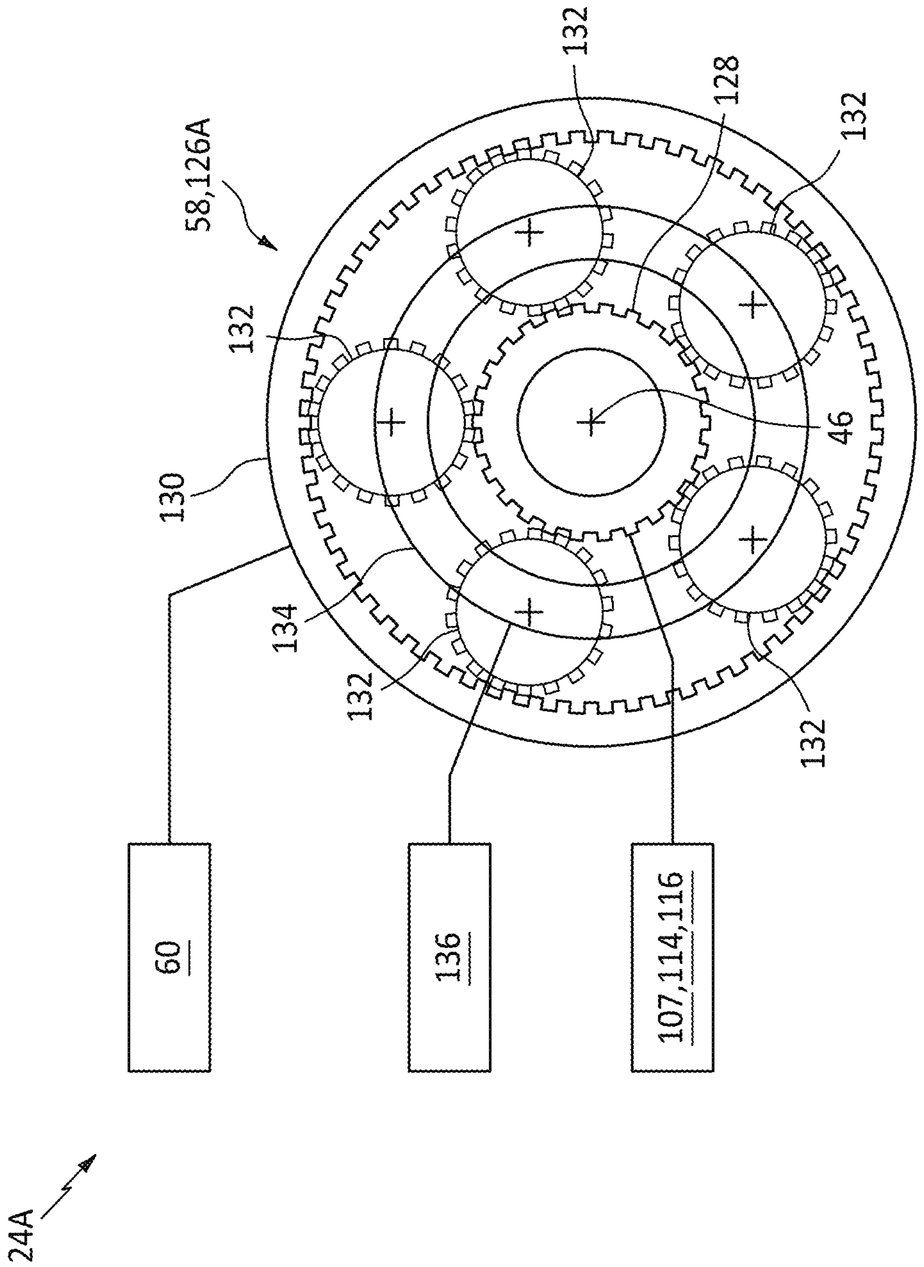
FIG. 8 is a partial schematic end view illustration of the aircraft propulsion system of FIG. 7 at the star gear system.

Referring to FIGS. 7 and 8, the counter-rotating geartrain 126A may be configured as or otherwise include a regular epicyclic star gear system; e.g., a non-stepped epicyclic star gear system. The counter-rotating geartrain 126A of FIGS. 7 and 8, for example, includes a star system sun gear 128, a star system ring gear 130, a plurality of star system intermediate gears 132 (e.g., star gears) and a stationary star system carrier 134. The star system sun gear 128 is rotatable about the propulsion system axis 46 of the first aircraft propulsion system 24A. The star system sun gear 128 is coupled to and rotatable with the low speed rotating assembly 116 and its low speed shaft 114 of the first aircraft propulsion system 24A. The low speed rotating assembly 116 of the first aircraft propulsion system 24A is thereby operatively coupled to the counter-rotating geartrain 126A through the star system sun gear 128. The star system ring gear 130 circumscribes the star system sun gear 128 and the star system intermediate gears 132. The star system ring gear 130 is rotatable about the propulsion system axis 46 of the first aircraft propulsion system 24A. The star system ring gear 130 is coupled to and rotatable with the propulsor rotor 60 of the first aircraft propulsion system 24A. The propulsor rotor 60 of the first aircraft propulsion system 24A is thereby operatively coupled to the counter-rotating geartrain 126A through the star system ring gear 130. The star system intermediate gears 132 are arranged circumferentially about the propulsion system axis 46 of the first aircraft propulsion system 24A and the star system sun gear 128 in an array. Each of the star system intermediate gears 132 is disposed radially between and meshed with the star system sun gear 128 and the star system ring gear 130. Each of the star system intermediate gears 132 is rotatably mounted to the star system carrier 134. The star system carrier 134 is fixedly connected to a stationary structure 136 of the first aircraft propulsion system 24A.

Figure 9:
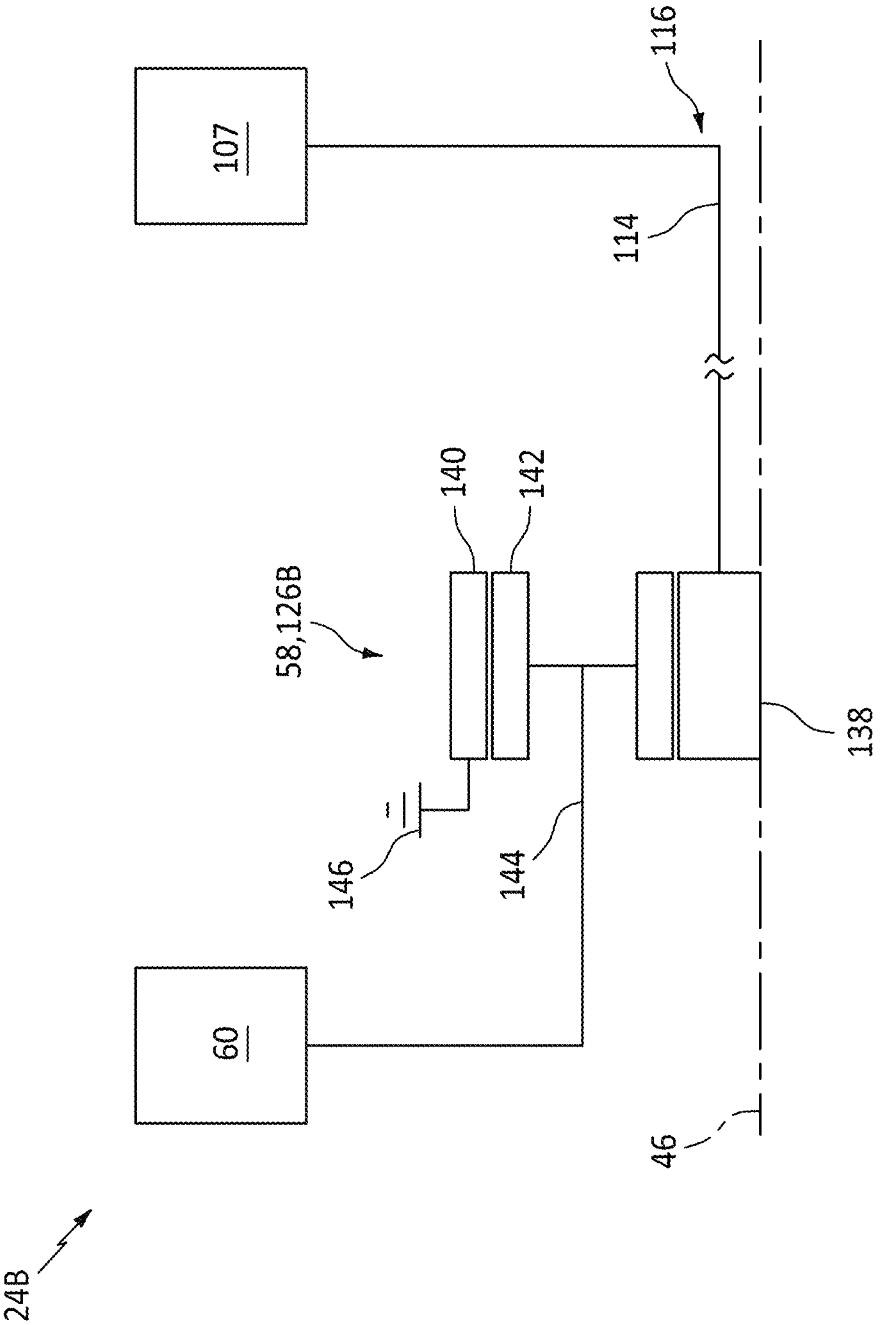
FIG. 9 is a partial schematic illustration of an aircraft propulsion system at a planetary gear system.
Figure 10:
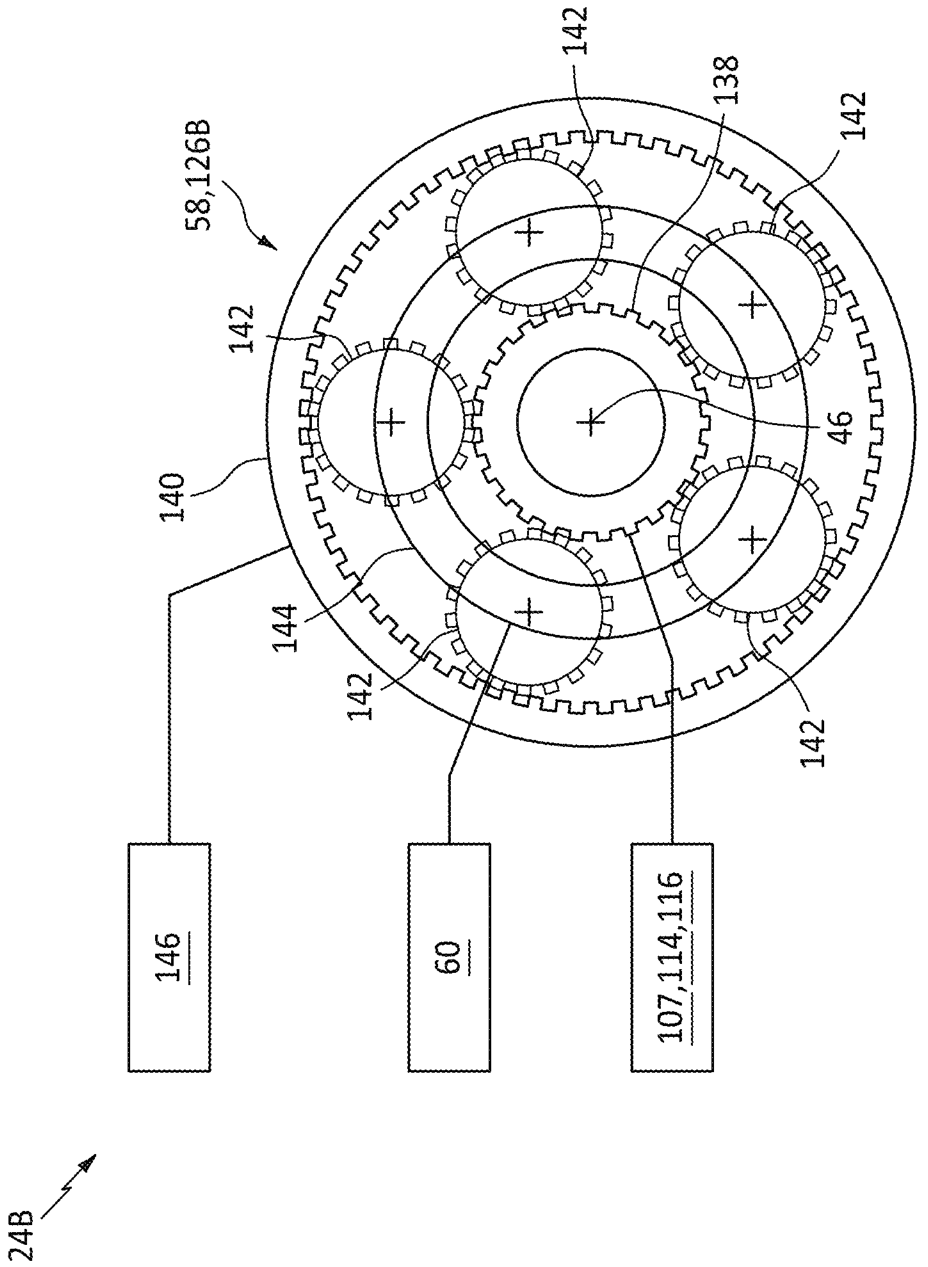
FIG. 10 is a partial schematic end view illustration of the aircraft propulsion system of FIG. 9 at the planetary gear system.

Referring to FIGS. 9 and 10, the co-rotating geartrain 126B may be configured as or otherwise include a regular epicyclic planetary gear system; e.g., a non-stepped epicyclic planetary gear system. The co-rotating geartrain 126B of FIGS. 9 and 10, for example, includes a planetary system sun gear 138, a stationary planetary system ring gear 140, a plurality of planetary system intermediate gears 142 (e.g., planet gears) and a planetary system carrier 144. The planetary system sun gear 138 is rotatable about the propulsion system axis 46 of the second aircraft propulsion system 24B. The planetary system sun gear 138 is coupled to and rotatable with the low speed rotating assembly 116 and its low speed shaft 114 of the second aircraft propulsion system 24B. The low speed rotating assembly 116 of the second aircraft propulsion system 24B is thereby operatively coupled to the co-rotating geartrain 126B through the planetary system sun gear 138. The planetary system ring gear 140 circumscribes the planetary system sun gear 138 and the planetary system intermediate gears 142. The planetary system ring gear 140 is fixedly connected to a stationary structure 146 of the second aircraft propulsion system 24B. The planetary system intermediate gears 142 are arranged circumferentially about the propulsion system axis 46 of the second aircraft propulsion system 24B and the planetary system sun gear 138 in an array. Each of the planetary system intermediate gears 142 is disposed radially between and meshed with the planetary system sun gear 138 and the planetary system ring gear 140. Each of the planetary system intermediate gears 142 is rotatably mounted to the planetary system carrier 144. The planetary system carrier 144 is rotatable about the propulsion system axis 46 of the second aircraft propulsion system 24B. The planetary system carrier 144 is coupled to and rotatable with the propulsor rotor 60 of the second aircraft propulsion system 24B. The propulsor rotor 60 of the second aircraft propulsion system 24B is thereby operatively coupled to the co-rotating geartrain 126B through the planetary system carrier 144.

While the counter-rotating geartrain 126A and the co-rotating geartrain 126B are described above with regular (e.g., non-stepped) epicyclic gear systems, the present disclosure is not limited to such exemplary arrangements. The counter-rotating geartrain 126A and/or the co-rotating geartrain 126B may alternatively each be configured with a respective stepped epicyclic gear system. As will become more apparent below, utilizing such a stepped epicyclic gear system arrangement may facilitate provision of multiple diametrical pitches within the same epicyclic gear system. By contrast, each gear within a regular epicyclic gear system arrangement has a common diametrical pitch since a single intermediate gear meshes with both a sun gear and a ring gear.

Figure 11:
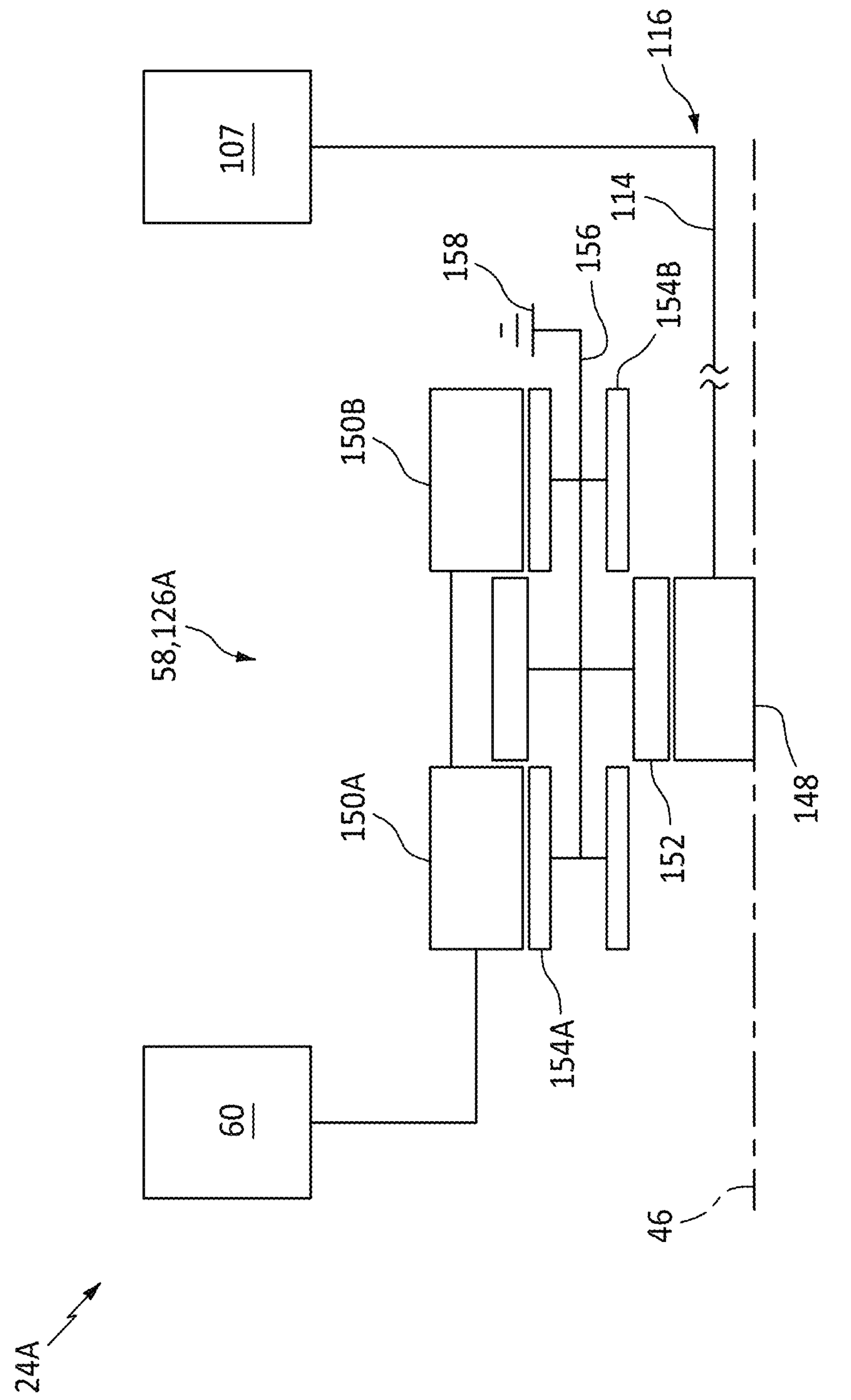
FIG. 11 is a partial schematic illustration of an aircraft propulsion system at a stepped star gear system.
Figure 12:
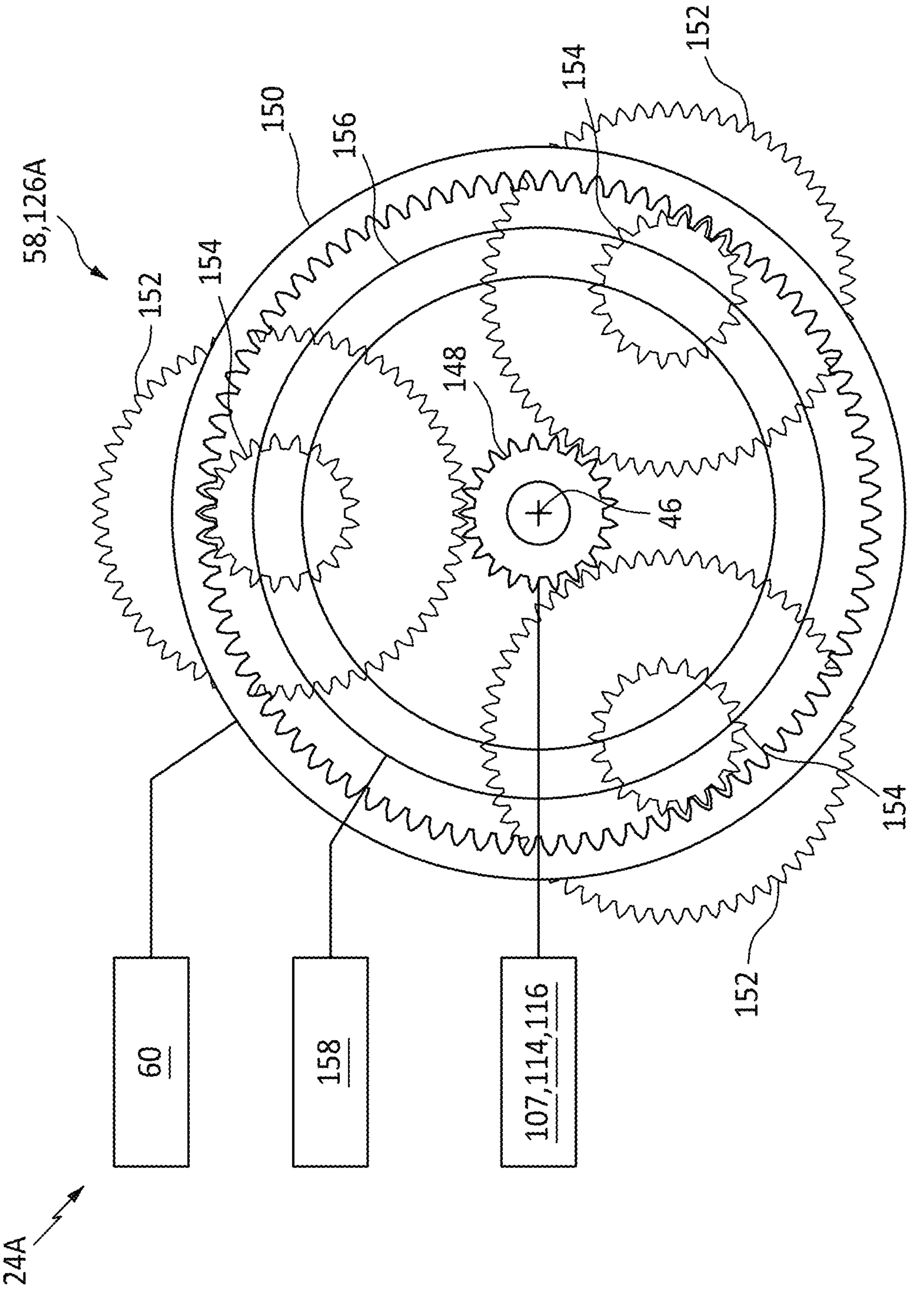
FIG. 12 is a partial schematic end view illustration of the aircraft propulsion system of FIG. 11 at the stepped star gear system.

Referring to FIGS. 11 and 12, the counter-rotating geartrain 126A may be configured as or otherwise include a stepped epicyclic star gear system. The counter-rotating geartrain 126A of FIGS. 11 and 12, for example, includes a star system sun gear 148, one or more star system ring gears 150A and 150B (generally referred to as "150"), a set of star system first intermediate gears 152 (e.g., star gears), one or more sets of star system second intermediate gears 154A and 154B (generally referred to as "154") (e.g., star gears) and a stationary star system carrier 156. The star system sun gear 148 is rotatable about the propulsion system axis 46 of the first aircraft propulsion system 24A. The star system sun gear 148 is coupled to and rotatable with the low speed rotating assembly 116 and its low speed shaft 114 of the first aircraft propulsion system 24A. The low speed rotating assembly 116 of the first aircraft propulsion system 24A is thereby operatively coupled to the counter-rotating geartrain 126A through the star system sun gear 148. Each star system ring gear 150 circumscribes a respective set of the star system second intermediate gears 154. Each star system ring gear 150 is rotatable about the propulsion system axis 46 of the first aircraft propulsion system 24A. The star system ring gears 150 are coupled to and rotatable with the propulsor rotor 60 of the first aircraft propulsion system 24A. The propulsor rotor 60 of the first aircraft propulsion system 24A is thereby operatively coupled to the counter-rotating geartrain 126A through the star system ring gears 150. The star system first intermediate gears 152 are arranged circumferentially about the propulsion system axis 46 of the first aircraft propulsion system 24A and the star system sun gear 148 in an array. Each of the star system first intermediate gears 152 is meshed with the star system sun gear 148. Each of the star system second intermediate gears 154 in each set is rotatable coupled to a respective one of the star system first intermediate gears 152. Each set of the star system second intermediate gears 154 are arranged circumferentially about the propulsion system axis 46 of the first aircraft propulsion system 24A. Each of the star system second intermediate gears 154 in each set is meshed with a respective one of the star system ring gears 150. Each of the star system intermediate gear 152, 154 is rotatably mounted to the star system carrier 156. The star system carrier 156 is fixedly connected to a stationary structure 158 of the first aircraft propulsion system 24A.

Figure 13:
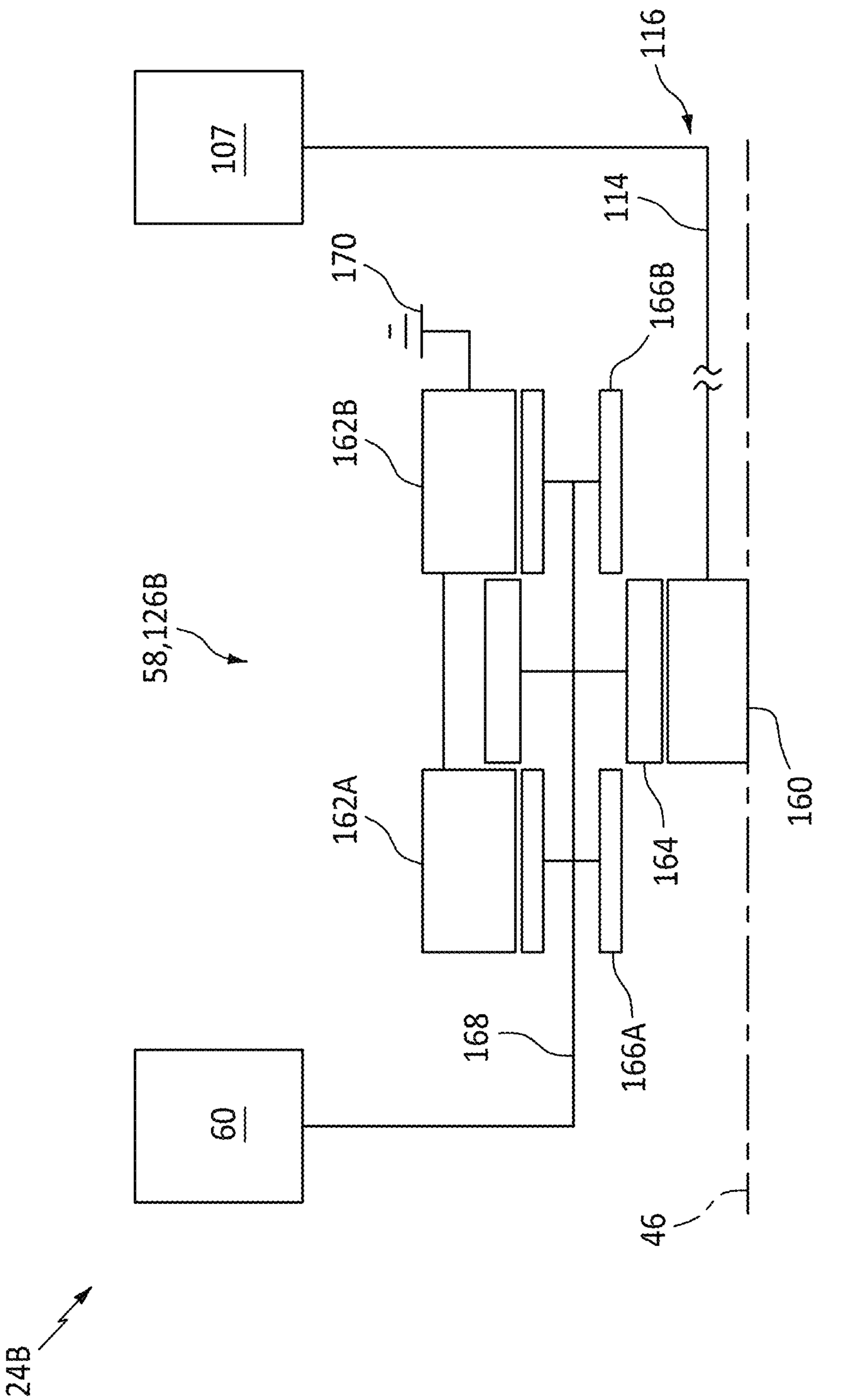
FIG. 13 is a partial schematic illustration of an aircraft propulsion system at a stepped planetary gear system.
Figure 14:
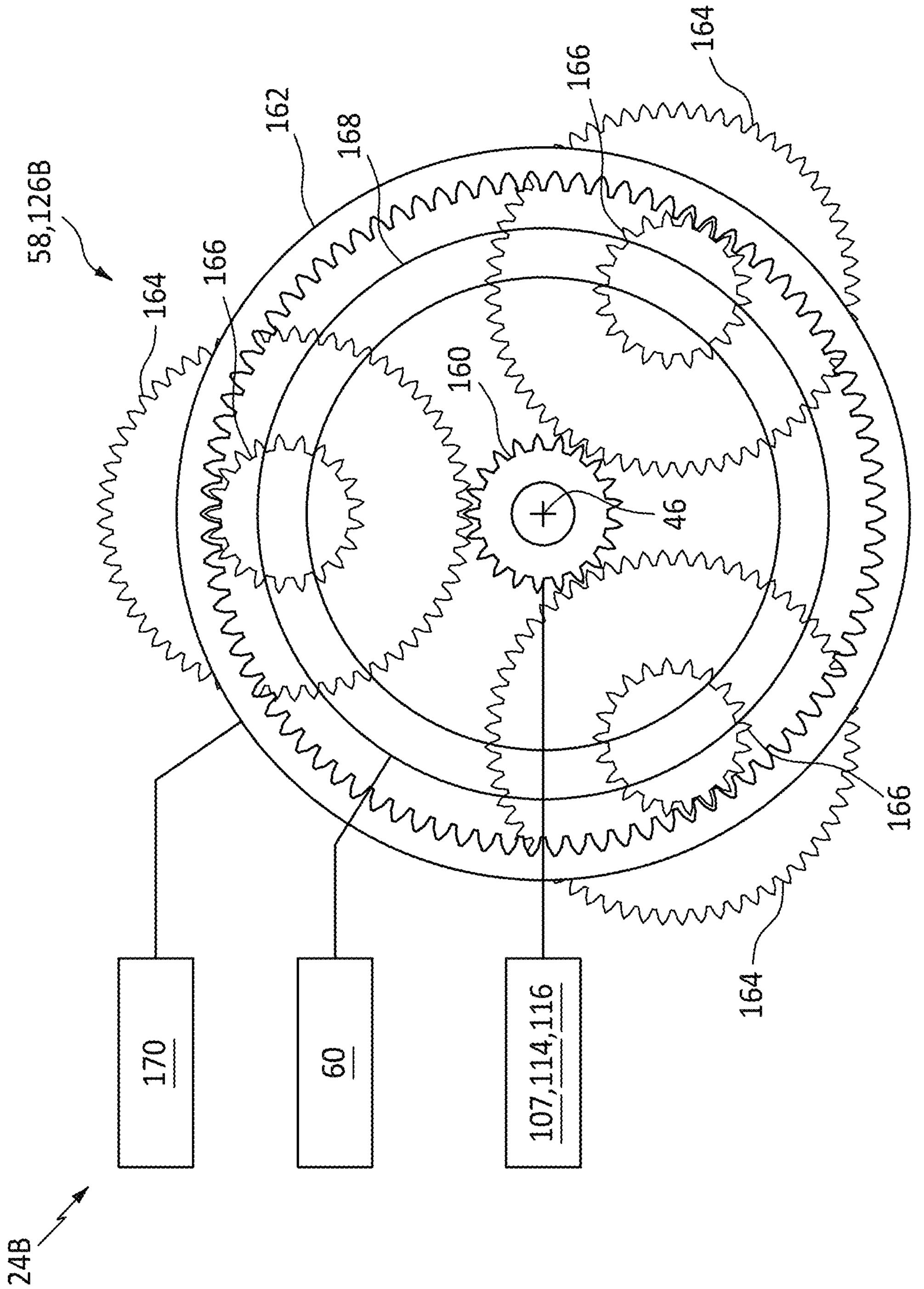
FIG. 14 is a partial schematic end view illustration of the aircraft propulsion system of FIG. 13 at the stepped planetary gear system.

Referring to FIGS. 13 and 14, the co-rotating geartrain 126B may be configured as or otherwise include a stepped epicyclic planetary gear system. The co-rotating geartrain 126B of FIGS. 13 and 14, for example, includes a planetary system sun gear 160, one or more stationary planetary system ring gears 162A and 162B (generally referred to as "162"), a set of planetary system first intermediate gears 164 (e.g., planet gears), one or more sets of planetary system second intermediate gears 166A and 166B (generally referred to as "166") (e.g., planet gears) and a planetary system carrier 168. The planetary system sun gear 160 is rotatable about the propulsion system axis 46 of the second aircraft propulsion system 24B. The planetary system sun gear 160 is coupled to and rotatable with the low speed rotating assembly 116 and its low speed shaft 114 of the second aircraft propulsion system 24B. The low speed rotating assembly 116 of the second aircraft propulsion system 24B is thereby operatively coupled to the co-rotating geartrain 126B through the planetary system sun gear 160. Each planetary system ring gear 162 circumscribes a respective set of the planetary system second intermediate gears 166. Each planetary system ring gear 162 is fixedly connected to a stationary structure 170 of the second aircraft propulsion system 24B. The planetary system first intermediate gears 164 are arranged circumferentially about the propulsion system axis 46 of the second aircraft propulsion system 24B and the planetary system sun gear 160 in an array. Each of the planetary system first intermediate gears 164 is meshed with the planetary system sun gear 160. Each of the planetary system second intermediate gears 166 in each set is rotatable coupled to a respective one of the planetary system first intermediate gears 164. Each set of the planetary system second intermediate gears 166 are arranged circumferentially about the propulsion system axis 46 of the second aircraft propulsion system 24B. Each of the planetary system second intermediate gears 166 in each set is meshed with a respective one of the planetary system ring gears 162. Each of the planetary system intermediate gear 164 and 166 is rotatably mounted to the planetary system carrier 168. The planetary system carrier 168 is rotatable about the propulsion system axis 46 of the second aircraft propulsion system 24B. The planetary system carrier 168 is coupled to and rotatable with the propulsor rotor 60 of the second aircraft propulsion system 24B. The propulsor rotor 60 of the second aircraft propulsion system 24B is thereby operatively coupled to the co-rotating geartrain 126B through the planetary system carrier 168.

In some embodiments, the geartrains 58 of the aircraft propulsion systems 24 may be configured with common (the same) or similar gear ratios.

Figure 15:
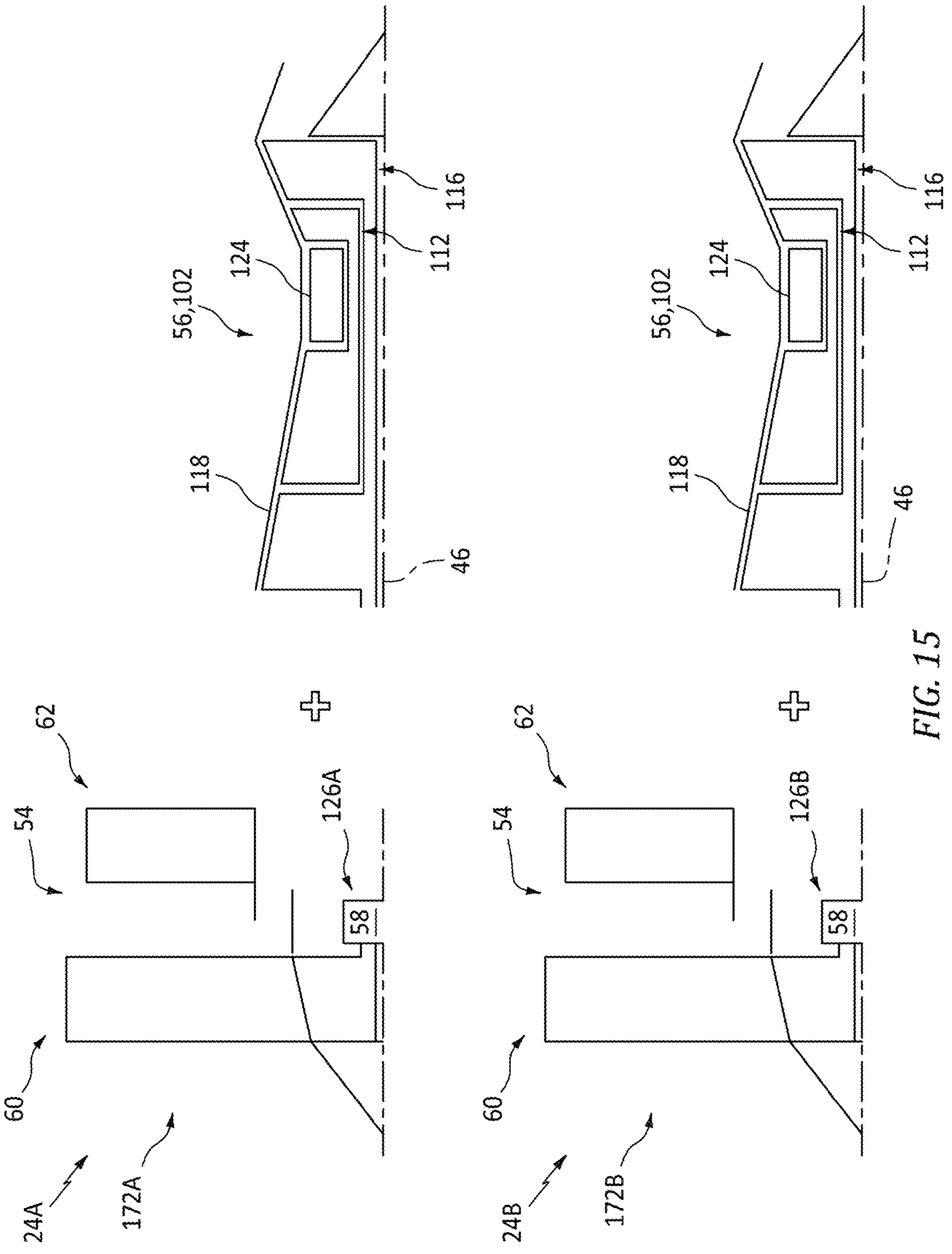
FIG. 15 is a partial schematic illustration depicting assembly of first and second aircraft propulsion systems.

In some embodiments, referring to FIG. 15, each of the aircraft propulsion systems 24A and 24B may be configured with a unique propulsor module 172A, 172B (generally referred to as "172"). This propulsor module 172 may include the respective propulsor rotor 60 and the respective geartrain 58, 126A, 126B. The propulsor module 172 may (or may not) also include the guide vane structure 62. However, the aircraft propulsion systems 24A and 24B may include common engine cores or at least one or more common internal core components and/or structures; e.g., the rotating structure(s) 112, 116, the combustor 124, etc. Herein, the term "common" may describe elements which are identical and may share a single manufacturer/supplier part number. With such an arrangement, each aircraft propulsion system 24 may be assembled by mating and mounting its unique propulsor module 172 to the common engine core 102. Spare parts for the companion first and second aircraft propulsion systems 24A, 24B may thereby be significantly reduced because a single replacement engine core and/or set a parts may be used with either the first aircraft propulsion system 24A or the second aircraft propulsion system 24B. Of course, it is contemplated the propulsor modules 172 may also include one or more common components; e.g., the actuator(s) 74 and/or 88 of FIG. 4.

Figure 16:
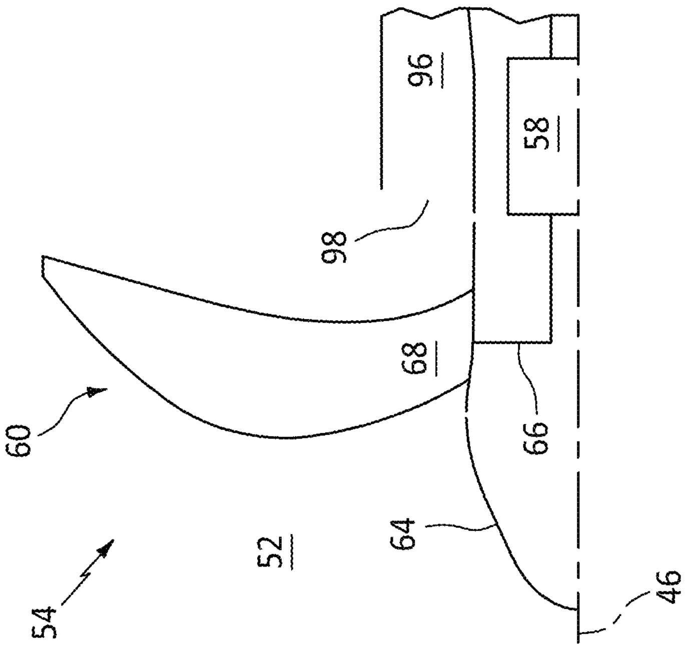
FIG. 16 is a partial schematic illustration of an exemplary one of the propulsion systems configured without a guide vane structure.

Referring to FIG. 3, while each of the aircraft propulsion systems 24A and 24B is described above as including the guide vane structure 62, the present disclosure is not limited to such an exemplary propulsion system configuration. For example, referring to FIG. 16, each aircraft propulsion system 24 may alternatively be configured without an open guide vane structure. Each aircraft propulsion system 24 of FIG. 16, for example, is configured as a single rotor (SR) open rotor propulsion system.

The propulsion section 54 of FIG. 3 is described above with a tractor configuration; e.g., where the propulsor rotor 60 is disposed at or otherwise near the propulsion system forward end 48. It is contemplated, however, the propulsion section 54 may alternatively be disposed at or otherwise near the propulsion system aft end 50 to provide a pusher fan configuration. Moreover, while the low speed rotating assembly 116 is described above with the LPC rotor 104, it is contemplated the LPC rotor 104 may be omitted from the low speed rotating assembly 116 such that the LPT rotor 107 is a power turbine rotor. Of course, the LPC rotor 104 may alternatively be included with a third (e.g., intermediate speed) rotating structure rotationally discrete from the low speed rotating assembly 116.

The guide vane structure 62 is described above as a fixed (e.g., non-rotatable) guide vane structure. It is contemplated, however, the guide vane structure 62 may alternatively be selectively rotatable about the respective propulsion system axis 46. With such an arrangement, each aircraft propulsion system 24 may be configured as an open rotor propulsion system with a swirl recovery blade (SRB) open rotor architecture. More particularly, each aircraft propulsion system 24 may operate as: (A) a counter-rotating open rotor (CROR) propulsion system during a dual rotor mode of operation (e.g., when both the propulsor rotor 60 and the structure 62 are counter-rotating about the respective propulsion system axis 46); and (B) a single open rotor and swirl recovery vane (SRV) propulsion system during a single rotor mode of operation (e.g., when the propulsor rotor 60 is rotating and the structure 62 is rotationally fixed about the respective propulsion system axis 46). Note, when the guide vane structure 62 is configured to selectively rotate about the respective propulsion system axis 46, the moving guide vanes 76 operate as propulsor blades.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:

a first propulsion system disposed laterally to a first side of a fuselage of the aircraft, the first propulsion system including a first open propulsor rotor, a first open guide vane structure, a first engine core and a first geartrain, the first open propulsor rotor configured to rotate in a first rotational direction about a first axis, the first engine core comprising a first rotating structure with a first turbine rotor, and the first rotating structure configured to rotate in the first rotational direction about the first axis and drive rotation of the first open propulsor rotor through the first geartrain, the first geartrain comprising a first epicyclic gear system, the first rotating structure coupled to the first geartrain through a first geartrain sun gear, and the first open propulsor rotor coupled to the first geartrain through a first geartrain carrier; and a second propulsion system disposed laterally to a second side of the fuselage of the aircraft, the second propulsion system including a second open propulsor rotor, a second open guide vane structure, a second engine core and a second geartrain, the second open propulsor rotor configured to rotate in a second rotational direction about a second axis that is opposite the first rotational direction, the second engine core comprising a second rotating structure with a second turbine rotor, and the second rotating structure configured to rotate in the first rotational direction about the second axis and drive rotation of the second open propulsor rotor through the second geartrain, the second geartrain comprising a second epicyclic gear system, the second rotating structure coupled to the second geartrain through a second geartrain sun gear, and the second open propulsor rotor coupled to the second geartrain through a second geartrain ring gear.

2. The assembly of claim 1, wherein one of the first geartrain or the second geartrain comprises a planetary gear system; and the other one of the first geartrain or the second geartrain comprises a star gear system.

3. The assembly of claim 1, wherein the first geartrain and the second geartrain have a common gear ratio.

4. The assembly of claim 1, wherein the first geartrain includes the first geartrain sun gear configured to rotate about the first axis;

a first geartrain ring gear circumscribing the first geartrain sun gear;

a plurality of first geartrain intermediate gears meshed with and radially between the first geartrain sun gear and the first geartrain ring gear; and the first geartrain carrier, each of the plurality of first geartrain intermediate gears rotatably mounted to the first geartrain carrier.

5. The assembly of claim 1, wherein the second geartrain includes the second geartrain sun gear configured to rotate about the second axis;

the second geartrain ring gear circumscribing the second geartrain sun gear;

a plurality of second geartrain intermediate gears meshed with and radially between the second geartrain sun gear and the second geartrain ring gear; and a second geartrain carrier, each of the second geartrain plurality of intermediate gears rotatably mounted to the second geartrain carrier.

6. The assembly of claim 5, wherein the second geartrain carrier is stationary.

7. The assembly of claim 1, wherein the first geartrain includes the first geartrain sun gear configured to rotate about the first axis;

a plurality of first geartrain first intermediate gears arranged circumferentially about the first axis and meshed with the first geartrain sun gear;

a plurality of first geartrain second intermediate gears arranged circumferentially about the first axis, each of the plurality of first geartrain second intermediate gears rotatably coupled to a respective one of the plurality of first geartrain first intermediate gears;

a first geartrain ring gear circumscribing and meshed with the plurality of first geartrain second intermediate gears; and the first geartrain carrier, each of the plurality of first geartrain first intermediate gears and each of the plurality of first geartrain second intermediate gears rotatably mounted to the first geartrain carrier.

8. The assembly of claim 1, wherein the second geartrain includes the second geartrain sun gear configured to rotate about the second axis;

a plurality of second geartrain first intermediate gears arranged circumferentially about the second axis and meshed with the second geartrain sun gear;

a plurality of second geartrain second intermediate gears arranged circumferentially about the second axis, each of the plurality of second geartrain second intermediate gears rotatably coupled to a respective one of the plurality of second geartrain first intermediate gears;

the second geartrain ring gear circumscribing and meshed with the plurality of second intermediate gears; and a second geartrain carrier, each of the plurality of second geartrain first intermediate gears and each of the plurality of second geartrain second intermediate gears rotatably mounted to the second geartrain carrier.

9. The assembly of claim 1, wherein the first open guide vane structure is axially next to the first open propulsor rotor; and the second open guide vane structure is axially next to the second open propulsor rotor.

10. The assembly of claim 1, wherein the first open guide vane structure is downstream of the first open propulsor rotor; and the second open guide vane structure is downstream of the second open propulsor rotor.

11. The assembly of claim 1, wherein the first open guide vane structure is open to and disposed in an environment external to the first aircraft propulsion system.

12. The assembly of claim 1, wherein the first open guide vane structure is configured as a rotationally fixed structure.

13. An assembly for an aircraft, comprising:

a first propulsion system mounted to an aircraft fuselage at a first side of the aircraft fuselage, the first propulsion system including a first open propulsor rotor, a first engine core and a first geartrain, the first open propulsor rotor disposed at a forward end of the first propulsion system, the first open propulsor rotor configured to rotate in a first rotational direction about a first axis, the first engine core comprising a first rotating structure with a first turbine rotor, and the first rotating structure configured to rotate in the first rotational direction about the first axis and drive rotation of the first open propulsor rotor through the first geartrain; and a second propulsion system mounted to the aircraft fuselage at a second side of the aircraft fuselage, the second propulsion system including a second open propulsor rotor, a second engine core and a second geartrain, the second open propulsor rotor disposed at a forward end of the second propulsion system, the second open propulsor rotor configured to rotate in a second rotational direction about a second axis that is opposite the first rotational direction, the second engine core comprising a second rotating structure with a second turbine rotor, and the second rotating structure configured to rotate in the first rotational direction about the second axis and drive rotation of the second open propulsor rotor through the second geartrain.

14. An assembly for an aircraft, comprising:

an aircraft airframe;

a first propulsion system arranged with the aircraft airframe, the first propulsion system including a first open propulsor rotor, a first open guide vane structure, a first engine core and a first geartrain, the first open propulsor rotor configured to rotate in a first rotational direction about a first axis, the first engine core comprising a first rotating structure with a first turbine rotor, and the first rotating structure configured to rotate in the first rotational direction about the first axis and drive rotation of the first open propulsor rotor through the first geartrain;

a second propulsion system arranged with the aircraft airframe opposite the first propulsion system, the second propulsion system including a second open propulsor rotor, a second open guide vane structure, a second engine core and a second geartrain, the second open propulsor rotor configured to rotate in a second rotational direction about a second axis that is opposite the first rotational direction, the second engine core comprising a second rotating structure with a second turbine rotor, and the second rotating structure configured to rotate in the first rotational direction about the second axis and drive rotation of the second open propulsor rotor through the second geartrain;

the first geartrain comprising a first geartrain sun gear, a plurality of first geartrain first intermediate gears, a plurality of first geartrain second intermediate gears, a first geartrain ring gear and a first geartrain carrier, the first geartrain sun gear configured to rotate about the first axis, the plurality of first geartrain first intermediate gears arranged circumferentially about the first axis and meshed with the first geartrain sun gear, the plurality of first geartrain second intermediate gears arranged circumferentially about the first axis, each of the plurality of first geartrain second intermediate gears rotatably coupled to a respective one of the plurality of first geartrain first intermediate gears, the first geartrain ring gear circumscribing and meshed with the plurality of first geartrain second intermediate gears, and each of the plurality of first geartrain first intermediate gears and each of the plurality of first geartrain second intermediate gears rotatably mounted to the first geartrain carrier;

the second geartrain comprising a second geartrain sun gear, a plurality of second geartrain first intermediate gears, a plurality of second geartrain second intermediate gears, a second geartrain ring gear and a second geartrain carrier, the second geartrain sun gear configured to rotate about the second axis, the plurality of second geartrain first intermediate gears arranged circumferentially about the second axis and meshed with the second geartrain sun gear, the plurality of second geartrain second intermediate gears arranged circumferentially about the second axis, each of the plurality of second geartrain second intermediate gears rotatably coupled to a respective one of the plurality of second geartrain first intermediate gears, the second geartrain ring gear circumscribing and meshed with the plurality of second intermediate gears, and each of the plurality of second geartrain first intermediate gears and each of the plurality of second geartrain second intermediate gears rotatably mounted to the second geartrain carrier;

the first rotating structure coupled to the first geartrain through the first geartrain sun gear, and the first open propulsor rotor coupled to the first geartrain through the first geartrain carrier; and the second rotating structure coupled to the second geartrain through the second geartrain sun gear, and the second open propulsor rotor coupled to the second geartrain through the second geartrain ring gear.

* * * * *